No. 732,415. PATENTED JUNE 30, 1903.
A. JANET.
COMPOUND SLEEVE FOR FLEXIBLE SHAFTS.
APPLICATION FILED OCT. 11, 1902.
NO MODEL.
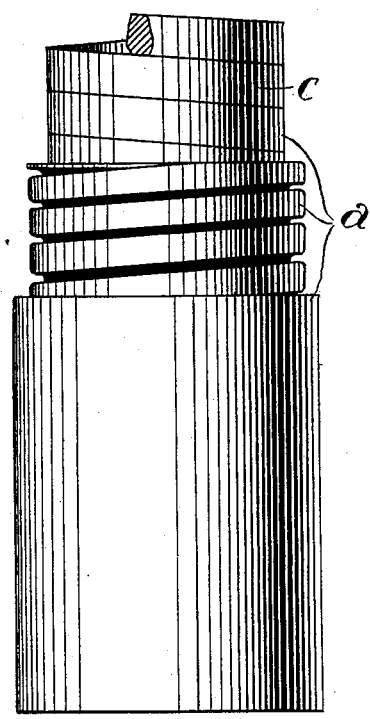
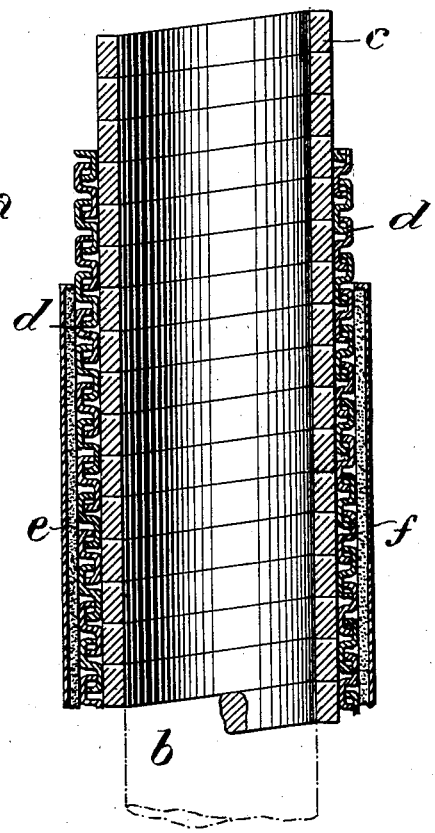
Witnesses.
Inventor.
Armand Janet
by B. Singer Attorney.

No. 732,415. Patented June 30, 1903.

UNITED STATES PATENT OFFICE.

ARMAND JANET, OF PARIS, FRANCE.

COMPOUND SLEEVE FOR FLEXIBLE SHAFTS.

SPECIFICATION forming part of Letters Patent No. 732,415, dated June 30, 1903.

Application filed October 11, 1902. Serial No. 126,962. (No model.)

*To all whom it may concern:*

Be it known that I, ARMAND JANET, a citizen of the French Republic, and a resident of Paris, France, have invented certain new and useful Improvements in Compound Sleeves for Flexible Shafts, of which the following is a specification.

Flexible shafts for the transmission of motive power are frequently mounted in a non-rotating cover or sleeve with the object of determining the direction for the internal rotary portion or core, also of affording protection to operators from shocks or kicks produced by reason of the high rotary speed, and of affording a receptacle to contain the necessary amount of lubricant to insure proper working of said shaft without heating.

I attain the aforesaid objects by the construction hereinafter described of a sleeve adapted to contain and protect the core of flexible shafts.

In the drawings, Figure 1 is an elevation of a section of a sleeve constructed according to my invention; and Fig. 2 is a central longitudinal section therethrough, the revoluble flexible core or shaft being indicated in dotted lines.

In carrying out the invention I provide a flexible tube like the hose commonly used for distributing fluids under pressure. The said hose is constructed of a metal strip $d$ of appropriate size rolled to an angular S form in cross-section and wound spirally in such manner that the edges of one spiral will over and under lap and interlock with the edges of the adjacent spirals on either side, as shown. A suitable packing $e$, preferably asbestos cord, is introduced, by means of which a tight joint is provided. Such hose has sufficient flexibility to enable it to be curved in any required direction, but is, however, rigid enough to be able to resist any tendency to alter its form or direction without intention. Moreover, being used as a flexible sleeve it is capable of effectually retaining the lubricant for the internal shafting; but such sleeve by itself is not sufficient as a cover for flexible shafts, because it will soon be rendered defective unless furnished with means for preventing very rapid wear or destruction by the high-speed revolutions of the core, which would wear and cut the thin metal strips very rapidly, so that the sleeve would be no more able to keep the lubricant, and also on account of the fact that if the flexible shaft is subjected to varying or irregular resistances it may tend to twist or buckle in the interior of the sleeve, and thereby increase the pressure upon local parts of the latter by reason of the irregular working.

In order to counteract the frictional wear and tear caused by the core $b$, and thus avoid the aforementioned objection, I introduce a helical spring $c$ between the core of the flexible shaft and the aforesaid metallic hose, preferably wound oppositely to said hose, so as to take up the wear caused by the frictional parts, and this without unduly interfering with the flexibility of the whole. The irregular local pressures are, however, readily communicated through the helical spring, as the latter may expand in diameter, and thereby affect the joint of the metallic tubing, which may become locally unclasped and even destroyed altogether.

To overcome the last objection referred to, I provide a cover $f$, of leather or canvas, which is firmly sewed or otherwise effectively fastened around the outside of the metallic flexible tubing, and thus prevent the destruction of the latter by the undue expansion of its diameter, while at the same time it is shielded by the asbestos packing from the oil or lubricant leaking through the joints of the metallic tubing.

Having now fully described my invention, what I claim, and desire to secure by Letters Patent, is—

1. The compound sleeve consisting of flexible tubing, an internal helical spring in said tubing and an external cover of durable fibrous material, as herein described and for the purpose stated.

2. The compound sleeve for flexible shafts, consisting of the spirally-wound overlapping and interlocking metallic strip, the internal helical spring oppositely wound, and the external cover of fibrous material.

3. The compound sleeve for flexible shafts, consisting of the spirally-wound overlapping and interlocking metallic strip, the internal helical spring, the asbestos packing, and the external cover of fibrous material.

In testimony whereof I have hereunto set my hand in presence of two witnesses.

ARMAND JANET.

Witnesses:
 ADOLPH STURM,
 EDWARD P. MACLEAN.